March 9, 1965  J. M. ROBERTSON  3,172,304
MULTIPLE SURFACE BEARING
Filed Jan. 31, 1962  2 Sheets-Sheet 1

INVENTOR.
JOHN M. ROBERTSON
BY Whittemore,
Hulbert & Belknap
ATTORNEYS.

March 9, 1965   J. M. ROBERTSON   3,172,304
MULTIPLE SURFACE BEARING
Filed Jan. 31, 1962   2 Sheets-Sheet 2

INVENTOR.
JOHN M. ROBERTSON
BY Whittemore,
Hulbert & Belknap
ATTORNEYS.

United States Patent Office 3,172,304
Patented Mar. 9, 1965

3,172,304
MULTIPLE SURFACE BEARING
John M. Robertson, Birmingham, Mich., assignor, by mesne assignments, to Universal American Corporation, New York, N.Y., a corporation of Delaware
Filed Jan. 31, 1962, Ser. No. 170,175
7 Claims. (Cl. 74—579)

The present invention relates to a multiple surface bearing and to the combination of a V-type engine having angularly separated banks of cylinders associated with a crank shaft and multiple surface bearings for the crank shaft having load bearing lobes in substantial alignment with the separate banks of cylinders.

It is an object of the present invention to provide a multiple surface bearing effective to eliminate film breakthrough to develop extremely high oil film pressure to reduce shaft whip and to lower impact forces on the bearing.

It is a further object of the present invention to provide a multiple surface bearing adapted to reduce bearing friction by a substantial amount over present conventional bearings.

It is a feature of the present invention to provide a bearing having oriented bearing zones whose radius of curvature is greater than the radius of the shaft supported in the bearing.

It is a further feature of the present invention to provide a journal bearing having a plurality of lobes adapted to have minimum clearance with respect to a cylindrical shaft, the lobes being provided by internal cylindrical surfaces having a radius of curvature greater than the radius of the shaft and located eccentrically with respect to the center of the bearings.

It is a further object of the present invention to provide in combination a V-type engine having angularly spaced banks of cylinders, a crank shaft, a journal bearing for the crank shaft having four internal bearing lobes, the lobes being arranged in pairs, the lobes of each pair being in substantial alignment with one of the banks of cylinders.

It is a feature of the present invention to provide, in the combination described in the preceding paragraph, bearings in which the lobes are provided by cylindrical surfaces having a radius of curvature greater than the radius of the shaft and located eccentrically with respect to the center of the bearing.

It is a further feature of the present invention to provide bearings of the type described in the foregoing having steel shells and linings formed of an aluminum alloy.

It is a further object of the present invention to provide journal bearings having a plurality of lobes defining a minimum clearance with respect to a shaft journal substantially less than has been possible with cylindrical bearings, and specifically, having a minimum clearance which varies from approximately .0005" for a two-inch diameter journal to approximately .003" for a six-inch diameter journal.

Other objects and features of the invention will become apparent as the description proceeds, especially when taken in conjunction with the accompanying drawings, illustrating preferred embodiments of the invention, wherein.

The multiple surface bearing disclosed herein is designed to provide reduced operating clearance, lower friction, and longer life in reciprocating engines, particularly where the main bearing lobes are angular to the normal center line of the engine. The bearing is also particularly useful in connecting rod applications where the big end split is not inclined ninety degrees to the "I" beam section.

Figure 1:
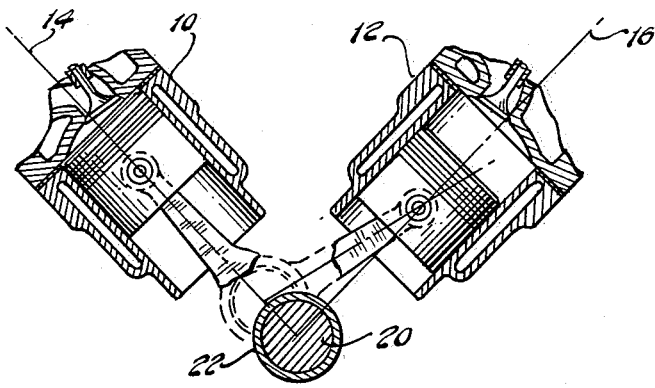
FIGURE 1 is a diagrammatic view illustrating the orientation or special relationship between a shaft journal and a pair of banks of cylinders of a V-type engine.

Referring first to FIGURE 1 there is diagrammatically illustrated the space relationship of the shaft journal and bearing to a pair of banks of cylinders. In this figure the cylinder banks are indicated at 10 and 12, the axial planes thereof extending as indicated in the construction lines 14 and 16 respectively. The crank shaft indicated at 20 is located so that is axis occupies the intersection between the axial planes 14 and 16. The bearing for the shaft 20 is indicated at 22.

In this case a ninety degrees V-type engine is illustrated so that the firing pressure is at approximately 45 degrees to the vertical centerline of the engine. In this case, as will subsequently be described in detail, the minimum clearance of the main bearing with respect to the shaft journal is placed at 45 degrees to the engine centerline on either side.

Figure 2:
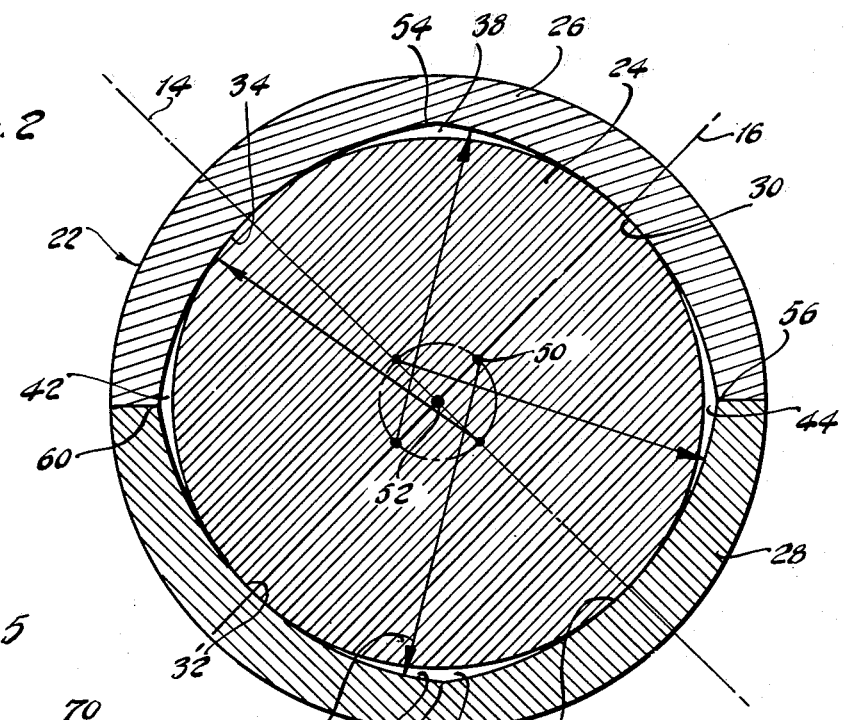
FIGURE 2 is an enlarged cross-sectional view of a shaft journal and bearing constructed in accordance with the present invention.

Referring now to FIGURE 2, the shaft journal is indicated at 24 and the bearing 22 is provided by a generally semi-cylindrical upper shell 26 and a generally semi-cylindrical lower shell 28. The inner surfaces of the bearing halves are formed to define zones of minimum clearance with respect to the shaft journal, these zones being provided in pairs, the lobes of each pair being in substantial alignment with the axial plane of a bank of cylinders. In FIGURE 2 the axial planes of the banks of cylinders are designated 14 and 16 and a pair of lobes 30 and 32 are provided in substantial alignment with the axial plane 16, and the remaining pair of lobes 34 and 36 are in substantial alignment with the axial plane 14.

The inner surface of the bearing, intermediate the lobes 30, 32, 34 and 36 is shaped to provide gradually increasing clearance with respect to the cylindrical shaft journal 24, this clearance reaching a maximum at zones located at the top and bottom of the bearing as indicated at 38 and 40, and at horizontally opposite sides as indicated at 42 and 44.

While the exact shape of the inner surface of the bearing need not by cylindrical, it is convenient to provide cylindrical surfaces having radii of curvature somewhat greater than the radius of the shaft journal and located eccentrically with respect to the center of the bearing.

It will be understood that in FIGURE 2 the clearance at 38, 40, 42 and 44 is grossly exaggerated for clarity, but in this figure the bearing surfaces are formed by intersecting cylindrical surfaces. Thus, the lobe 32 is formed by a cylindrical surface 46 having a radius of curvature 48 whose center is located at 50 eccentrically with respect to the center 52 of the shaft journal 24. It will be observed that the cylindrical bearing surfaces intersect at the zero, 90, 180 and 270-degrees points, as indicated at 54, 56, 58 and 60.

Figure 3:
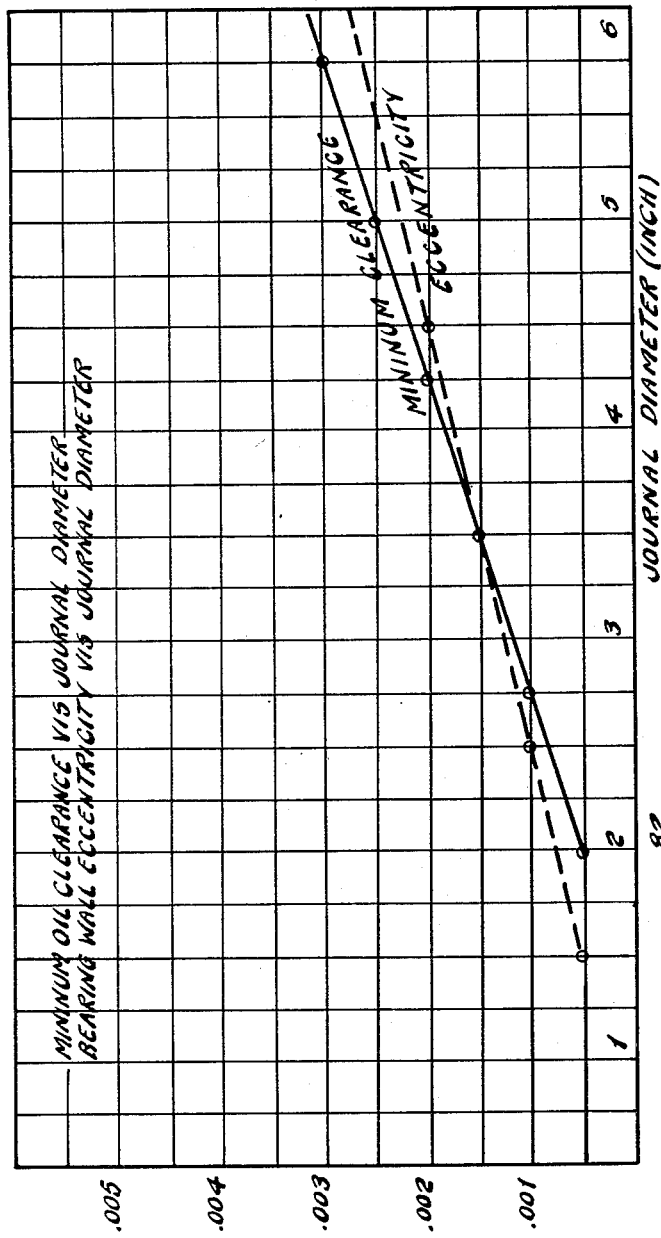
FIGURE 3 is a diagram showing the relationship of minimum clearance and bearing wall eccentricity to journal diameter.

As previously mentioned, the showing of FIGURE 2 is grossly exaggerated so that the relative shape of the bearing and journal is readily apparent. The actual dimensions of the bearings which have been found to be extremely efficient are indicated in FIGURE 3. In this figure journal diameter in inches is plotted as the abscissa and the dimensions of minimum oil clearance and eccentricity are plotted as the ordinate. From this figure it will be apparent that minimum clearance for a two-inch diameter journal is .0005" and increases to .001" for a 2¾ inch journal, to .002" for a 4¼ inch journal, and to .0025" for a 5-inch journal. Eccentricity on the other hand, varies uniformly from .0005" for a 1½ inch diameter journal to .0025" for a 5½ inch diameter journal.

Particular attention is called to the fact that the minimum oil clearance provided between each pair of oppositely disposed lobes is very substantially below conventional bearing practice. A commonly used rule of thumb in determining bearing clearance is .001" per inch of diameter of shaft journal.

The actual operating clearance in use is the diagonal dimension of the bore between opposed lobes less the journal diameter. The points of intersection of the radii of the internal bearing surfaces provide greater clearance area for oil entry.

One of the important advantages of the present invention is the efficient pumping of the lubricating oil, by shaft rotation, over the smooth surface of the bearing bore from the area of high clearance to the loaded area or operating clearance which provides a build-up of effective film pressure which separates the journal and bearing. This dampens the tendency of the crank shaft to whip and prevents noise.

With the present design of bearing, clearance can be better controlled than with conventional cylindrical bearing bores, as this design permits satisfactory oil flow through the bearing with minimum clearance only in the direction of reciprocal loading. Ground or conventional cylindrical bores with sufficient clearance for possible oil flow necessarily have enough clearance to allow movement of the journal in the bearing bore and generate noise. This noise is the result of impact loading. The moment of impact or load reversal can rupture the oil film and permit contact between the journal and the bearing surface.

In accordance with the present invention each operating surface of the bearing has the correct development or radius with the ideal angle of approach between journal and bearing, which generates sufficient film pressure when the shaft rotates to maintain shaft stability and increases the range of clearance which can be used without excessive whip. As a result of this, "selective fit" may be eliminated in production.

Friction in a bearing is the product of the subtended area of the bearing and the oil viscosity. The multiple surface bearings disclosed herein reduce the area of support and it has been determined that a reduction in friction of as much as 33⅓% over conventional bearings with the same operating clearance may be obtained.

Since the present multiple surface bearing also permits a substantial decrease in clearance, extremely high film pressure is developed at the loaded areas, tending to center the shaft, reduce whip, and lower impact forces on the bearing. The ability to maintain an oil film under maximum load conditions, plus the relatively small areas of high pressure, permitting a reduction in bearing friction of as much as 25%. Any reduction in friction of course increases the available horsepower and improves fuel economy.

The multiple surface bearing herein, as indicated above, concentrates the load over a smaller area of the bearing than is true in prior conventional bearings. In computing loading for the bearing disclosed herein it is assumed that the load is sustained on one-half of the projected area. Accordingly, the bearing must be designed so as to withstand this unusually high loading.

Figure 5:
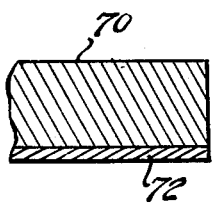
FIGURE 5 is an enlarged fragmentary sectional view through a bearing constructed in accordance with the present invention.

Referring now to FIGURE 5 there is shown a fragmentary cross-section of a bearing which comprises a steel shell 70 having a lining 72 of an aluminum alloy bearing material. Bearings of this type have been found adequate to sustain the exceptionally high loading resulting from the use of multiple area bearing surfaces.

Figure 4:
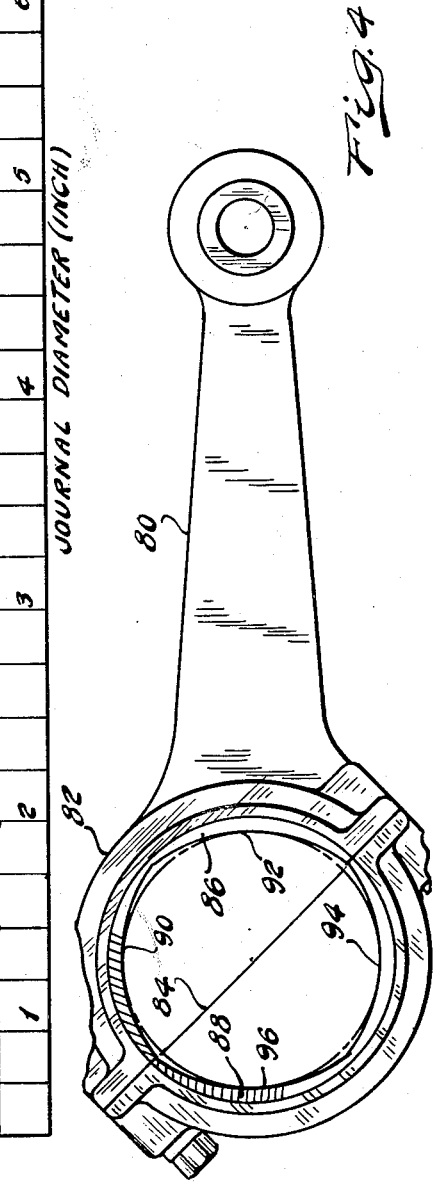
FIGURE 4 illustrates the application of the bearing to a special connecting rod.

Referring now to FIGURE 4 there is illustrated another use of the multiple surface bearing. In this case a connecting rod is indicated at 80 having its big end 82 split along the plane indicated at 84. In this case a multiple surface bearing is provided in the big end formed of bearing halves 86 and 88, the edges of which are abutted at the juncture 84.

The bearing made up of the generally semi-cylindrical bearing halves 86 and 88 is of the type best illustrated in FIGURE 2, and is arranged to have its lobes located along the vertical and horizontal centerlines as indicated at 90, 92, 94 and 96. As a result of this, the maximum clearance appears at the 45-degrees zones which coincide approximately with the bearing split 85. Accordingly, since maximum clearance is present at these 45-degrees points, exact alignment of the bearing edges is not as critical as has formerly been the case. Prior to the present invention any mismatching of the bearing edges along the split at the big end of the crank shaft constituted wiping surfaces at one side or the other of the shaft which tended to disrupt the oil film and caused bearing failure.

The multiple surface bearing of the present invention may be produced in different ways but the most efficient production results from a broaching operation in which the generally cylindrical broach is modified by grinding approximately 90-degrees zones thereon to a slightly greater radius of curvature than the radius of the broach with the center of curvature being located eccentrically of the broach. These four cylindrical surfaces on the broach intersect but the zone of intersection of course corresponds to a portion of the bearing where maximum oil clearance exists. At the load sustaining lobes of the bearing produced by the broach, the load sustaining surface is a smooth cylindrical surface having an angle of approach with respect to a cylindrical shaft journal which is of course determined by the radius of curvature of the lobe.

The drawings and the foregoing specification constitute a description of the improved multiple surface bearing in such full, clear, concise and exact terms as to enable any person skilled in the art to practice the invention, the scope of which is indicated by the appended claims.

What I claim as my invention is:

1. In combination, a connecting rod having a large end provided with an arcuate recess of approximately semi-circular cross-section, a removable cap of approximately semi-circular cross-section forming with the recess at the end of said rod and opening of generally circular cross-section, the line of juncture between the recessed rod end and removable cap extending approximately at 45 degrees to the length of said rod, a generally cylindrical bearing in said opening, said bearing comprising a pair of generally semi-cylindrical parts in edge abutment, said bearing having its inner surface made up of four intersecting partially cylindrical surfaces each of which has its center of curvature located beyond the axis of said bearing from said surface and defining alternated zones of maximum and minimum clearance with respect to a cylindrical journal centered therein, zones of maximum clearance being located at the abutted edges of said bearing parts.

2. In combination, a connecting rod having a large end provided with an arcuate recess of approximately semi-circular cross-section, a removable cap of approximately semi-circular cross-section forming with the recess at the end of said rod an opening of generally circular cross-section, the line of juncture between the recessed rod end and removable cap extending approximately at 45 degrees to the length of said rod, a generally cylindrical bearing in said opening, said bearing comprising a pair of generally semi-cylindrical parts in edge abutment, said bearing having its inner surface made up of four intersecting partially cylindrical surfaces each of which has its center of curvature located beyond the axis of said bearing from said surface and defining alternated zones of maximum and minimum clearance with respect to a cylindrical journal centered therein, zones of maximum clearance being located at the abutted edges of said bearing parts, the abutted edges of said bearing parts being located at the junction between said cap and recessed rod end.

3. A generally cylindrical bearing formed of a steel shell and an aluminum alloy lining, said bearing comprising a pair of generally semi-cylindrical parts in edge abutment, said bearing having its inner surface made up of four intersecting partially cylindrical surfaces each of which has its center of curvature located beyond the axis of said bearing from said surface and defining alternated zones of maximum and minimum clearance with respect to a cylindrical journal centered therein, zones of maximum clearance being located at the abutted edges of said bearing parts.

4. A generally cylindrical bearing formed of a steel shell and an aluminum alloy lining, said bearing comprising a pair of generally semi-cylindrical parts in edge abutment, said bearing having its inner surface made up of four intersecting partially cylindrical surfaces each of which has its center of curvature located beyond the axis of said bearing from said surface and defining alternated zones of maximum and minimum clearance with respect to a cylindrical journal centered therein, zones of maximum clearance being located at the abutted edges of said bearing parts, each of said bearing parts having two zones of minimum clearance spaced from each other and spaced uniformly from the edges of said parts.

5. For use in a V-type engine having two angularly separated banks of cylinders with pistons reciprocable therein and a crank shaft having its axis of rotation at the intersection of the planes occupied by said banks of cylinders, a connecting rod having a small end and a large end, the small end thereof being adapted to be connected to one of the engine pistons, the large end thereof having a generally semi-cylindrical recess, a removable cap of generally semi-cylindrical shape forming with the recessed end of said rod an opening of generally cylindrical shape, the line of juncture between the recessed rod end and the removable cap extending at an oblique angle to the longitudinal axis of said rod, two bearing halves of generally semi-cylindrical shape received in said opening with their lateral edges abutted substantially along the line of juncture between said recess and said cap, the inner surface of said bearing halves each having two partially cylindrical intersecting bearing surfaces each of which has its center of curvature located beyond the axis of said opening from said surface, said bearing surfaces together defining with respect to a cylindrical journal centered therein alternated zones of minimum and maximum clearance, one zone of minimum clearance of each bearing half being centered in alignment with the longitudinal axis of said rod and the other zone of minimum clearance of each bearing half being spaced substantially from the lateral edge thereof.

6. Connecting rod structure as defined in claim 5 in which the minimum journal clearance is variable in accordance with the diameter of the journal and varies substantially uniformly from about .0005" for a two-inch diameter journal to .003" for a six-inch diameter journal.

7. Connecting rod structure as defined in claim 5 in which the banks of cylinders are separated by an angle of substantially 90 degrees, the line of juncture between the recess at the large end of said crank shaft and said cap extends at an angle of substantially 45 degrees to the longitudinal axis of said rod, and in which the zones of minimum clearance on each of said bearing halves are separated from each other by an angle of substantially 90 degrees and are spaced substantially from the lateral edges of said bearing half by an angle of substantially 45 degrees.

References Cited in the file of this patent

UNITED STATES PATENTS

| | | |
|---|---|---|
| 1,236,511 | Waring | Aug. 14, 1919 |
| 1,404,015 | Edwards | Jan. 17, 1922 |
| 1,475,965 | Pence | Dec. 4, 1923 |
| 1,703,096 | Burtnett | Feb. 26, 1929 |
| 1,948,176 | Hopkins | Feb. 20, 1934 |
| 2,280,385 | Dickson | Apr. 21, 1942 |
| 2,722,047 | Cousino | Nov. 1, 1955 |
| 2,796,659 | Buske | June 25, 1957 |
| 2,963,006 | Karde | Dec. 6, 1960 |
| 3,094,415 | Gallatin et al. | June 18, 1963 |